(12) United States Patent
Nishihiro et al.

(10) Patent No.: US 11,766,927 B2
(45) Date of Patent: Sep. 26, 2023

(54) VEHICLE

(71) Applicants:JATCO Ltd, Fuji (JP); NISSAN MOTOR CO., LTD., Yokohama (JP)

(72) Inventors: Yoshimasa Nishihiro, Zama (JP); Masahiko Tahara, Yokosuka (JP); Masaharu Mochizuki, Atsugi (JP); Takurou Hirano, Yokohama (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 148 days.

(21) Appl. No.: 17/614,942

(22) PCT Filed: Jun. 1, 2020

(86) PCT No.: PCT/JP2020/021620
§ 371 (c)(1),
(2) Date: Nov. 29, 2021

(87) PCT Pub. No.: WO2020/255690
PCT Pub. Date: Dec. 24, 2020

(65) Prior Publication Data
US 2022/0234436 A1     Jul. 28, 2022

(30) Foreign Application Priority Data
Jun. 21, 2019   (JP) .................................. 2019-115813

(51) Int. Cl.
*B60K 6/485*     (2007.10)
*B60K 6/28*      (2007.10)
(Continued)

(52) U.S. Cl.
CPC ................ *B60K 6/485* (2013.01); *B60K 6/28* (2013.01); *B60L 58/20* (2019.02); *B60K 2006/268* (2013.01)

(58) Field of Classification Search
CPC . B60K 6/485; B60K 6/48; B60K 6/28; B60K 2006/268; B60L 58/20; B60L 58/18
See application file for complete search history.

(56) References Cited

U.S. PATENT DOCUMENTS 6,843,337 B2 *  1/2005  Matsubara ............ B60W 10/26
                                              903/918
6,962,135 B2 * 11/2005  Kahlon ................. B60W 10/06
                                              123/339.14
(Continued)

FOREIGN PATENT DOCUMENTS

JP     2005-086988 A     3/2005
JP     2006-174619 A     6/2006
(Continued)

*Primary Examiner* — John D Walters
(74) *Attorney, Agent, or Firm* — Foley & Lardner LLP

(57) ABSTRACT

A vehicle includes: a low voltage battery constituted by a lithium-ion battery, the low voltage battery supplying an electric power to an electric component mounted to a vehicle; a high voltage battery constituted by a lithium-ion battery, the high voltage battery having an output voltage higher than an output voltage of the low voltage battery; a first rotating electrical machine that operates by an electric power supplied from the high voltage battery, the first rotating electrical machine generating a torque for driving the vehicle; and a second rotating electrical machine for starting the engine. The second rotating electrical machine operates by an electric power supplied from the high voltage battery.

3 Claims, 3 Drawing Sheets

(51) Int. Cl.
*B60L 58/20* (2019.01)
*B60K 6/26* (2007.10)

(56) References Cited

U.S. PATENT DOCUMENTS

| | | | |
|---|---|---|---|
| 10,981,559 B2* | 4/2021 | Kim | .................... F02N 11/0866 |
| 2016/0167537 A1 | 6/2016 | Abe | |
| 2017/0187316 A1 | 6/2017 | Kobayashi | |
| 2019/0184972 A1* | 6/2019 | Kim | ..................... B60W 10/06 |

FOREIGN PATENT DOCUMENTS

| | | |
|---|---|---|
| JP | 2010-130877 A | 6/2010 |
| JP | 2010-172137 A | 8/2010 |
| JP | 2011-055581 A | 3/2011 |
| JP | 2012-176730 A | 9/2012 |
| JP | 2013-095246 A | 5/2013 |
| JP | 2014-230468 A | 12/2014 |
| JP | 2015-212127 A | 11/2015 |
| JP | 2016-116351 A | 6/2016 |
| JP | 2016-195472 A | 11/2016 |
| JP | 2017-118775 A | 6/2017 |
| WO | WO-2015/189902 A1 | 12/2015 |

* cited by examiner

VEHICLE

TECHNICAL FIELD

The present invention relates to a vehicle including a high voltage battery and a low voltage battery.

BACKGROUND ART

JP2013-95246A discloses a vehicle that includes a high voltage battery including a lithium-ion battery and a low voltage battery including a lead-acid battery.

SUMMARY OF INVENTION

As a request for a vehicle having a function, such as automatic driving, a high reliability of a low voltage system power supply is requested. Therefore, a low voltage battery is possibly constituted by a highly reliable lithium-ion battery instead of a lead-acid battery.

However, a lithium-ion battery has a property that its output decreases at a low temperature. In view of this, for example, at a very low temperature (such as −20° C. to −30° C.), the output of the lithium-ion battery decreases, which possibly causes an insufficient output of a motor that starts an engine.

The present invention has been made in view of such technical problem, and it is an object of the present invention to allow an engine to be reliably started at a very low temperature even when a low voltage battery is constituted by a lithium-ion battery.

According to one aspect of the present invention, a vehicle includes: an engine; a low voltage battery constituted by a lithium-ion battery, the low voltage battery supplying an electric power to an electric component mounted to the vehicle; a high voltage battery constituted by a lithium-ion battery, the high voltage battery having an output voltage higher than an output voltage of the low voltage battery; a first rotating electrical machine that operates by an electric power supplied from the high voltage battery, the first rotating electrical machine generating a torque for driving the vehicle; and a second rotating electrical machine for starting the engine. The second rotating electrical machine operates by an electric power supplied from the high voltage battery.

According to the above-described aspect, the engine is allowed to be reliably started at a very low temperature even when the low voltage battery is constituted by a lithium-ion battery.

DESCRIPTION OF EMBODIMENTS

The following describes the embodiment of the present invention with reference to attached drawings.

Figure 1:
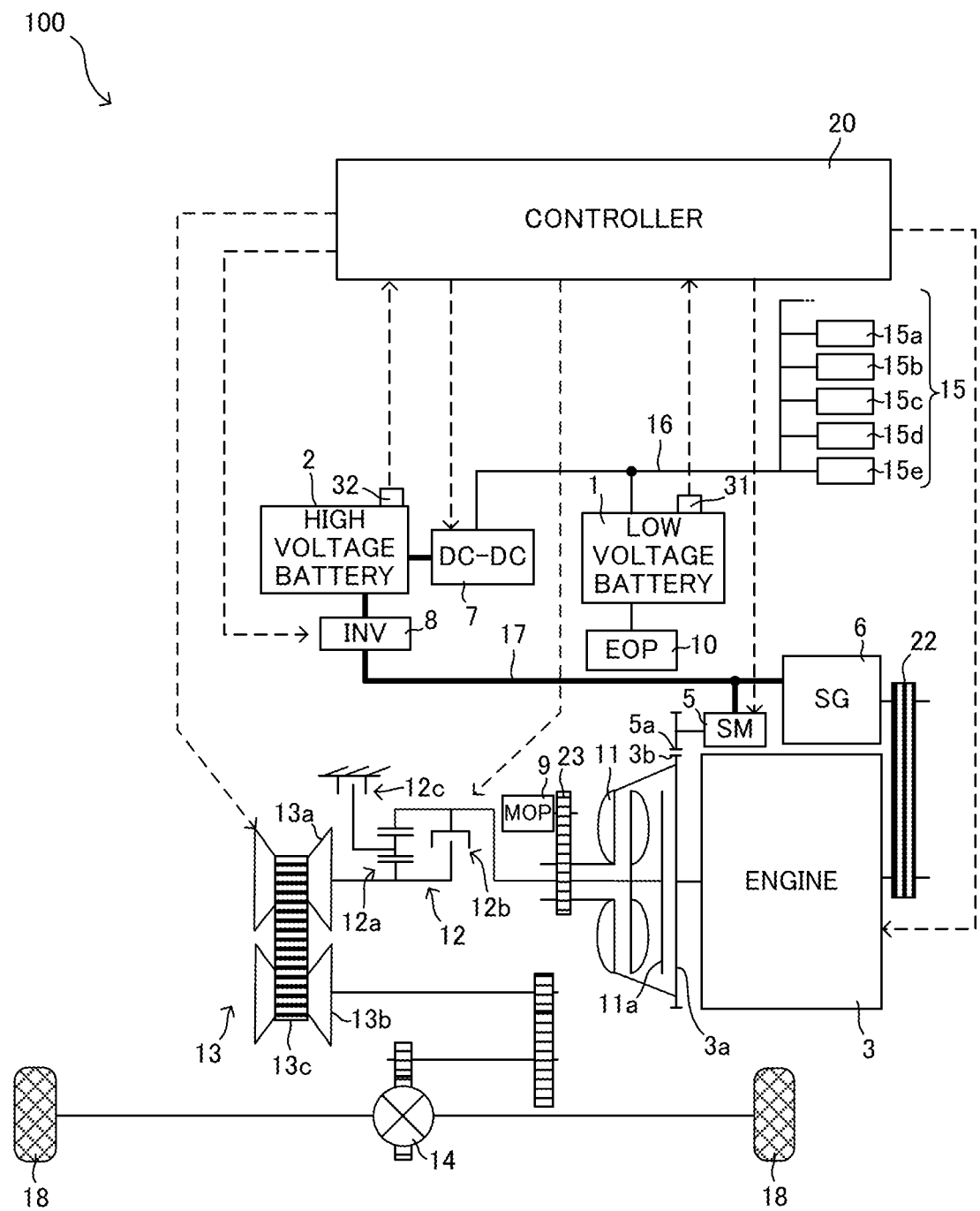
FIG. 1 is a schematic configuration diagram of a vehicle according to an embodiment.

FIG. 1 is a schematic configuration of a vehicle 100 according to the embodiment of the present invention. The vehicle 100 includes: a low voltage battery 1 as a first battery; a high voltage battery 2 as a second battery; an engine 3 as a driving source for running; a starter motor 5 (hereinafter referred to as "SM 5.") as a second rotating electrical machine used for start of the engine 3; a starter generator 6 (hereinafter referred to as "SG 6.") as a first rotating electrical machine used for electric generation and assist and start of the engine 3; a DC-DC converter 7; an inverter 8; a mechanical oil pump 9 and an electric oil pump 10 as sources of generation of a hydraulic pressure; a torque converter 11, a forward/reverse switching mechanism 12, a continuously variable transmission 13 (hereinafter referred to as "CVT 13."), and a differential mechanism 14 that constitute a power train; drive wheels 18; and a controller 20.

The low voltage battery 1 is a lithium-ion battery having a nominal voltage of 12 V DC. The low voltage battery 1 supplies an electric power to, for example, electric components 15 (such as an automatic driving camera 15a, a sensor 15b, a navigation system 15c, an audio 15d, and an air conditioner blower 15e) that are mounted to the vehicle 100 and operate at 12 V DC, and the electric oil pump 10. The low voltage battery 1 is connected to a low voltage circuit 16 together with the electric component 15.

The high voltage battery 2 is a lithium-ion battery having a nominal voltage (or output voltage) of 48 V DC higher than that of the low voltage battery 1. The nominal voltage of the high voltage battery 2 may be lower or higher than this and may be, for example, 30 V DC and 100 V DC. The high voltage battery 2 is connected to a high voltage circuit 17 together with, for example, the SM 5, the SG 6, and the inverter 8.

The DC-DC converter 7 is disposed on an electric circuit that connects the low voltage battery 1 to the high voltage battery 2. Accordingly, the low voltage circuit 16 and the high voltage circuit 17 are connected via the DC-DC converter 7. The DC-DC converter 7 converts an input voltage and outputs it. Specifically, the DC-DC converter 7 has: a step-up function that steps up 12 V DC of the low voltage circuit 16 to 48 V DC and outputs 48 V C to the high voltage circuit 17; and a step-down function that steps down 48 V DC of the high voltage circuit 17 to 12 V DC and outputs 12 V DC to the low voltage circuit 16. The DC-DC converter 7 can output the voltage of 12 V DC to the low voltage circuit 16 regardless of during driving or stop of the engine 3. In addition, when the remaining capacity of the high voltage battery 2 becomes low, 12 V DC of the low voltage circuit 16 can be stepped up to 48 V DC to be output to the high voltage circuit 17, thus allowing charging the high voltage battery 2.

The engine 3 is an internal combustion engine that uses, for example, gasoline and light oil as a fuel, and has, for example, a rotation speed and a torque to be controlled on the basis of a command from the controller 20.

The torque converter 11 is disposed on a power transmission path between the engine 3 and the forward/reverse switching mechanism 12 and transmits power via fluid. In addition, when the vehicle 100 runs at a predetermined lock-up vehicle speed or more, engaging a lock-up clutch 11a allows the torque converter 11 to enhance a power transmission efficiency of driving power from the engine 3.

The forward/reverse switching mechanism 12 is disposed on a power transmission path between the torque converter 11 and the CVT 13. The forward/reverse switching mechanism 12 includes a planetary gear mechanism 12a, a forward clutch 12b, and a reverse brake 12c. When the forward clutch 12b is engaged, and the reverse brake 12c is disengaged, rotation of the engine 3 input to the forward/reverse switching mechanism 12 via the torque converter 11 is output from the forward/reverse switching mechanism 12 to the CVT 13 with its rotation direction maintained. Conversely, when the forward clutch 12b is disengaged, and the reverse brake 12c is engaged, the rotation of the engine 3 input to the forward/reverse switching mechanism 12 via the torque converter 11 is decelerated and reversed to be output from the forward/reverse switching mechanism 12 to the CVT 13.

The CVT 13 is arranged on a power transmission path between the forward/reverse switching mechanism 12 and the differential mechanism 14 and steplessly changes a speed ratio corresponding to, for example, a vehicle speed and an accelerator position as an operation amount of an accelerator pedal. The CVT 13 includes a primary pulley 13a, a secondary pulley 13b, and a belt 13c wound around both the pulleys. The CVT 13 changes groove widths of the primary pulley 13a and the secondary pulley 13b by the hydraulic pressure to change contact radiuses of the pulleys 13a, 13b, and the belt 13c, which can steplessly change the speed ratio. A hydraulic pressure circuit (not illustrated) generates the hydraulic pressure required for the CVT 13 by using the hydraulic pressure generated by the mechanical oil pump 9 or the electric oil pump 10 as a source pressure.

The SM 5 is arranged such that a pinion gear 5a can be meshed with an outer peripheral gear 3b of a flywheel 3a of the engine 3. When the engine 3 starts from a cold state for the first time (hereinafter referred to as "initial start."), the electric power is supplied from the high voltage battery 2 to the SM 5, the pinion gear 5a is meshed with the outer peripheral gear 3b, and the flywheel 3a and further, a crankshaft are rotated.

It should be noted that the torque and the output required for starting the engine 3 are the largest at the initial start and are smaller at a start from a warm-up state, that is, a restart than those at the initial start. This is because while a temperature of an engine oil is low at the initial start, and a viscous resistance of the engine oil is large, after the initial activation, the temperature of the engine oil has risen, and the viscous resistance of the engine oil has been decreased. Since the SG 6 described later is driven via the belt, a large torque cannot be transmitted. In view of this, at the initial start, the engine 3 is driven by using the SM 5.

The SG 6 is connected to the crankshaft of the engine 3 via a V belt 22 and functions as an electric generator when receiving rotational energy from the engine 3. The electric power thus generated charges the high voltage battery 2 via the inverter 8. The SG 6 operates as an electric motor that is rotatably driven by receiving the supply of the electric power from the high voltage battery 2 and generates a torque for assisting the driving of the engine 3. Furthermore, the SG 6 is used for restarting the engine 3 by rotatably driving the crankshaft of the engine 3 when the engine 3 is restarted from an idling stop state. Since the SG 6 is connected to the crankshaft of the engine 3 by the V belt 22, when the engine 3 is started, a quiet and smooth start can be performed without a mesh sound of the gears. In view of this, at the restart, the engine 3 is driven by using the SG 6.

The mechanical oil pump 9 is an oil pump that operates by the rotation of the engine 3 transmitted via a chain 23. The mechanical oil pump 9 suctions a hydraulic oil stored in an oil pan to supply the oil to the lock-up clutch 11a, the forward/reverse switching mechanism 12, and the CVT 13 via a hydraulic pressure circuit (not illustrated).

The electric oil pump 10 is an oil pump that operates by the electric power supplied from the low voltage battery 1. The electric oil pump 10 operates when the engine 3 stops, and the mechanical oil pump 9 cannot be driven by the engine 3, such as in the idling stop state. Similarly to the mechanical oil pump 9, the electric oil pump 10 suctions a hydraulic oil stored in an oil pan to supply the oil to the lock-up clutch 11a, the forward/reverse switching mechanism 12, and the CVT 13 via a hydraulic pressure circuit (not illustrated). In particular, the ensured hydraulic pressure required for the CVT 13 suppresses slipperiness of the belt 13c. The electric oil pump 10 may be an oil pump that operates by the electric power supplied from the high voltage battery 2.

The controller 20 includes one or a plurality of microcomputers including a central processing unit (CPU), a read-only memory (ROM), a random access memory (RAM), and an input/output interface (I/O interface). The controller 20 corresponds to control means and executes a program stored in the ROM or the RAM by the CPU to integrally control, for example, the engine 3, the inverter 8 (the SG 6 and the electric oil pump 10), the DC-DC converter 7, the SM 5, the lock-up clutch 11a, the forward/reverse switching mechanism 12, and the CVT 13.

In addition, the controller 20 performs a charge control of the low voltage battery 1 and the high voltage battery 2 and an electric generation control of the SG 6 on the basis of a remaining capacity SOC1 of the low voltage battery 1 detected by a first remaining capacity detector 31 and a remaining capacity SOC2 of the high voltage battery 2 detected by a second remaining capacity detector 32. It should be noted that, in this embodiment, the first remaining capacity detector 31 corresponds to battery remaining capacity detecting means.

As described above, in this embodiment, the low voltage battery 1 and the high voltage battery 2 are constituted by a lithium-ion battery.

Typically, in a vehicle including a low voltage battery and a high voltage battery, during running, a low voltage system is ensured by using a dual system where the low voltage battery and a DC-DC converter are used. Then, conventionally, as such a low voltage battery, a lead-acid battery has been used.

For example, when automatic driving is performed, a high reliability is required for the low voltage system. However, a lead-acid battery is more difficult to grasp its deterioration and capacity than those of a lithium-ion battery, and has a reliability lower than that of the lithium-ion battery. In view of this, conventionally, when a lead-acid battery is used as the low voltage battery 1, since allocation of a reliability of the DC-DC converter 7 is needed to be increased, a high-performance DC-DC converter 7 is required. This increases the cost.

Therefore, in the vehicle 100 of this embodiment, the low voltage battery 1 is constituted by a lithium-ion battery. This allows the allocation of the reliability of the DC-DC converter 7 to be decreased, and thus the high-performance DC-DC converter 7 is not required. This can suppress the increase in cost.

However, under a very low temperature (such as a temperature of −20° C. to −30° C.) environment, a performance of a lithium-ion battery is inferior to that of a lead-acid battery. In view of this, when the low voltage battery 1 is used as a power supply of the SM 5, an output at the very low temperature is insufficient, and the engine 3 is not possibly started. Therefore, in this embodiment, the high voltage battery 2 is used as the power supply of the SM 5. Accordingly, at the very low temperature, an electric power required for the start of the engine 3 can be ensured.

Thus, the low voltage battery 1 is constituted by a lithium-ion battery, and furthermore, the high voltage battery 2 is used as the power supply of the SM 5. The present invention is thereby applicable to a vehicle where a reliability of a power supply system is required, and the engine 3 can be reliably started at the very low temperature.

Figure 2:
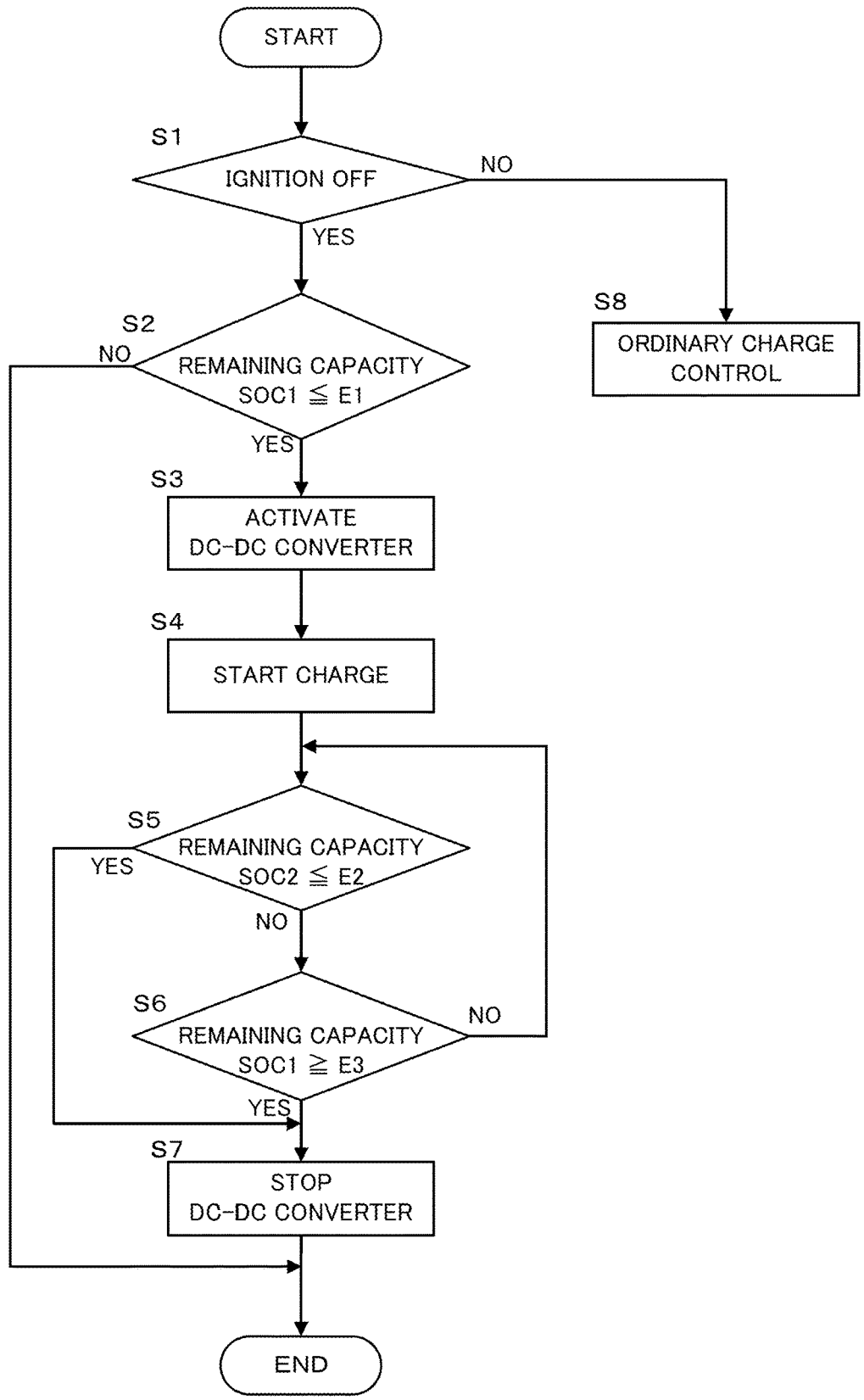
FIG. 2 is a flowchart illustrating a flow of a charge control according to the embodiment.

Incidentally, since the electric power of the low voltage battery 1 is used for a backup of the electric component 15 (such as a timepiece) also when an ignition is OFF (for example, in parking), the remaining capacity SOC1 of the low voltage battery 1 decreases with passage of time. In view of this, in the vehicle 100 in the embodiment, when the remaining capacity SOC1 of the low voltage battery 1 decreases when the ignition is OFF, the controller 20 performs the charge control that charges the low voltage battery 1 by using the high voltage battery 2. The following specifically describes this charge control with reference to the flowchart illustrated in FIG. 2.

At Step S1, the controller 20 determines whether the ignition is OFF or not. When the ignition is OFF, the process proceeds to Step S2. When the ignition is ON, the process proceeds to Step S8, and an ordinary charge control is performed.

At Step S2, the controller 20 determines whether the remaining capacity SOC1 is equal to or less than a predetermined value E1 or not. The controller 20 determines whether the remaining capacity SOC1 of the low voltage battery 1 detected by the first remaining capacity detector 31 is equal to or less than the predetermined value E1 or not. When the remaining capacity SOC1 is equal to or less than the predetermined value E1, the process proceeds to Step S3. When the remaining capacity SOC1 is larger than the predetermined value E1, the process proceeds to END.

At Step S3, the controller 20 activates the DC-DC converter 7. Since the DC-DC converter 7 is stopped when the ignition is OFF, the DC-DC converter 7 is activated.

At Step S4, the controller 20 starts the charge. Specifically, the controller 20 controls the DC-DC converter 7 to start the charge of the low voltage battery 1 using the high voltage battery 2. The DC-DC converter 7 converts the voltage input from the high voltage battery 2 via the high voltage circuit 17 into 12 V DC and outputs the converted voltage to the low voltage circuit 16. Accordingly, the low voltage battery 1 can be charged.

At Step S5, the controller 20 determines whether the remaining capacity SOC2 is equal to or less than a predetermined value E2 or not. The controller 20 determines whether the remaining capacity SOC2 of the high voltage battery 2 detected by the second remaining capacity detector 32 is equal to or less than the predetermined value E2 or not. When the remaining capacity SOC2 is equal to or less than the predetermined value E2, the charge control is canceled, and the process proceeds to Step S7. When the remaining capacity SOC2 is larger than the predetermined value E2, the process proceeds to Step S6.

At Step S6, the controller 20 determines whether the charge has been completed or not. Specifically, the controller 20 determines whether the remaining capacity SOC1 of the low voltage battery 1 detected by the first remaining capacity detector 31 is equal to or more than a predetermined value E3 or not. When the remaining capacity SOC1 of the low voltage battery 1 is equal to or more than the predetermined value E3, the process proceeds to Step S7. When the remaining capacity SOC1 of the low voltage battery 1 is less than the predetermined value E3, the process returns to Step S5.

At Step S7, the controller 20 stops the DC-DC converter 7. This ends the charge control.

Thus, in this embodiment, even when the ignition is OFF, the controller 20 monitors the remaining capacity SOC1 of the low voltage battery 1. Then, when the remaining capacity SOC1 of the low voltage battery 1 is detected to fall below the predetermined value E1 when the ignition is OFF, the controller 20 activates the DC-DC converter 7, and the low voltage battery 1 is charged by the electric power of the high voltage battery 2. Accordingly, in, for example, parking for a long period, the backup of the electric component 15, and the like can be continuously performed.

It should be noted that, the controller 20 does not need to always monitor the remaining capacity SOC1 of the low voltage battery 1 when the ignition is OFF and may detect the remaining capacity SOC1 of the low voltage battery 1 at regular intervals.

The lithium-ion battery includes a relay for cutting off a circuit for just in case, such as overdischarge. Since use of a latching relay as this relay eliminates the need for always energizing the relay, an electric power consumption of the low voltage battery 1 can be suppressed when the ignition is OFF.

While the above-described embodiment has been described that the low voltage battery 1 is charged by the electric power of the high voltage battery 2 when the remaining capacity SOC1 of the low voltage battery 1 is detected to fall below the predetermined value E1, the high voltage battery 2 may be configured to be charged by the electric power of the low voltage battery 1 when the remaining capacity SOC2 of the high voltage battery 2 is detected to fall below the predetermined value E2. In this case, the DC-DC converter 7 converts the voltage input from the low voltage battery 1 via the low voltage circuit 16 into 48 V DC and outputs the converted voltage to the high voltage circuit 17. Accordingly, the high voltage battery 2 can be charged.

Thus, according to this embodiment, the low voltage battery 1 is constituted by a lithium-ion battery, and furthermore, the high voltage battery 2 is used as the power supply of the SM 5. The present invention is thereby applicable to a vehicle where a reliability of a power supply system is required, and the engine 3 can be reliably started at the very low temperature.

In addition, in this embodiment, since the batteries (the low voltage battery 1 and the high voltage battery 2) are constituted by only a lithium-ion battery, the reliability of the power supply system is improved.

Furthermore, since the low voltage battery 1 can be charged by the high voltage battery 2 even when the ignition is OFF, in, for example, parking for a long period, the backup of the electric component 15, and the like can be continuously performed.

Figure 3:
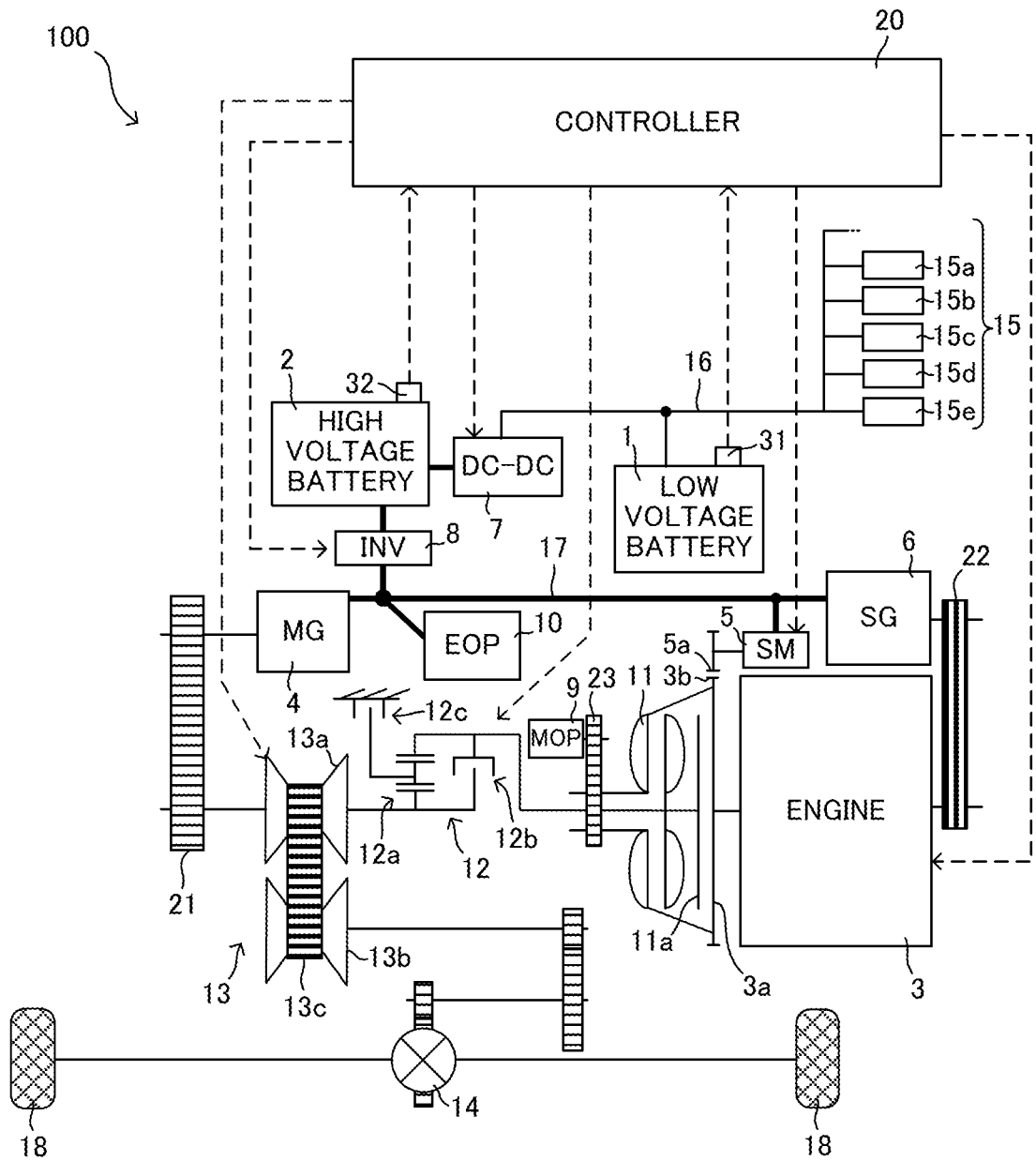
FIG. 3 is a schematic configuration diagram of a modification of the vehicle according to the embodiment.

Here, with reference to FIG. 3, a modification of this embodiment is described.

It should be noted that the following mainly describes the matters different from the configuration illustrated in FIG. 1, same reference numerals are given to the configurations same as the configuration illustrated in FIG. 1, and their descriptions are omitted as necessary.

The vehicle 100 illustrated in FIG. 3 further includes a motor-generator 4 (hereinafter referred to as "MG 4.") as a driving source for running.

The MG 4 is a synchronous rotating electrical machine in which a permanent magnet is embedded in a rotor, and a stator coil is wound around a stator. The MG 4 is connected to a shaft of the primary pulley 13a via a chain 21 wound between a sprocket disposed on a shaft of the MG 4 and a sprocket disposed on the shaft of the primary pulley 13a. The MG 4 is controlled by applying a three-phase alternating current generated by the inverter 8 on the basis of a command from the controller 20.

The MG 4 operates as an electric motor that receives the electric power supplied from the high voltage battery 2 to rotatably drive, thus generating a torque for driving the vehicle 100. In addition, the MG 4 functions as an electric generator that generates an electromotive force on both ends of the stator coil when the rotor receives the rotational energy from the engine 3 and the drive wheels 18, thus allowing the high voltage battery 2 to be charged. It should be noted that the MG 4 corresponds to the first rotating electrical machine.

The sprocket disposed on the shaft of the MG 4 and the sprocket disposed on the shaft of the primary pulley 13a are configured such that the latter has more teeth (for example, the number of teeth=1:3), and an output rotation of the MG 4 is decelerated and transmitted to the primary pulley 13a. Accordingly, the torque required for the MG 4 is decreased to downsize the MG 4, and a degree of a flexible arrangement of the MG 4 is improved. It should be noted that a gear train may be used instead of the chain 21.

Subsequently, actions and effects of the above-described embodiment are collectively described.

The vehicle 100 of this embodiment includes the engine 3, the first battery (low voltage battery 1), the second battery (high voltage battery 2), the first rotating electrical machine (SG 6, MG 4), and the second rotating electrical machine (SM 5) for starting the engine 3. The first battery (low voltage battery 1) is constituted by a lithium-ion battery and supplies an electric power to the electric component 15 mounted to the vehicle 100. The second battery (high voltage battery 2) is constituted by a lithium-ion battery and has an output voltage higher than an output voltage of the first battery (low voltage battery 1). The first rotating electrical machine (SG 6, MG 4) operates by an electric power supplied from the second battery (high voltage battery 2) and generates a torque for driving the vehicle 100. The second rotating electrical machine (SM 5) operates by an electric power supplied from the second battery (high voltage battery 2).

According to this configuration, even when the first battery (low voltage battery 1) is constituted by a lithium-ion battery, since the second rotating electrical machine (SM 5) for starting the engine 3 is connected to the second battery (high voltage battery 2) having the output voltage higher than the output voltage of the first battery (low voltage battery 1), the engine 3 can be reliably started also at the very low temperature.

Furthermore, since the first battery (low voltage battery 1) and the second battery (high voltage battery 2) are constituted by a lithium-ion battery, the reliability of the power supply system can be improved.

In addition, the vehicle 100 includes the SG 6 as the first rotating electrical machine. The SG 6 generates a torque for starting the engine 3 or assisting driving of the engine 3 when an electric power is supplied from the high voltage battery 2. The SG 6 is allowed to generate an electric power for charging the low voltage battery 1 and the high voltage battery 2 when receiving a rotational energy from the engine 3.

Since the SG 6 does not generate the mesh sound of the gears, driving the engine 3 by using the SG 6 at the restart can perform a quiet and smooth start.

The vehicle 100 includes the MG 4 as the first rotating electrical machine. The MG 4 generates a torque for driving the drive wheels 18 when an electric power is supplied from the high voltage battery 2. The MG 4 is allowed to generate an electric power for charging the low voltage battery 1 and the high voltage battery 2 when an input from the drive wheels 18 or the engine 3 is present.

Since the vehicle 100 including the MG 4 is, what is called, a strong hybrid vehicle and is equipped with the high voltage battery 2, a battery can be shared by the MG 4 and the SM 5.

The vehicle 100 further includes the DC-DC converter 7, the first remaining capacity detector 31 (battery remaining capacity detecting means), and the controller 20 (control means). The DC-DC converter 7 is disposed on an electric circuit connecting the low voltage battery 1 to the high voltage battery 2, converts an input voltage, and outputs the converted voltage. The first remaining capacity detector 31 detects the remaining capacity SOC1 of the low voltage battery 1. The controller 20 performs a charge control of the low voltage battery 1 and the high voltage battery 2.

The controller 20 activates the DC-DC converter 7 to charge the low voltage battery 1 by the electric power of the high voltage battery 2 when the remaining capacity SOC1 of the low voltage battery 1 is detected to fall below the predetermined value E1 when the ignition is OFF. The remaining capacity SOC1 is detected by the first remaining capacity detector 31.

Since the electric power of the low voltage battery 1 is used for a backup of the electric component 15 (such as a timepiece) also when an ignition is OFF (for example, in parking), the remaining capacity SOC1 of the low voltage battery 1 decreases. In view of this, when the remaining capacity SOC1 of the low voltage battery 1 decreases when the ignition is OFF, the controller 20 charges the low voltage battery 1 by using the high voltage battery 2. Accordingly, in, for example, parking for a long period, the backup of the electric component 15, and the like can be continuously performed.

The embodiment of the present invention is described above. However, the above embodiment does not intend to limit the technical scope of the present invention to the specific configurations of the above embodiment but only indicates part of application examples of the present invention.

This application claims priority based on Japanese Patent Application No. 2019-115813 filed with the Japan Patent Office on Jun. 21, 2019, the entire contents of which are incorporated into this specification.

The invention claimed is:

1. A vehicle comprising:
   an engine;
   a first battery constituted by a lithium-ion battery, the first battery supplying an electric power to an electric component mounted to the vehicle;
   a second battery constituted by a lithium-ion battery, the second battery having an output voltage higher than an output voltage of the first battery;
   a first rotating electrical machine that operates by an electric power supplied from the second battery, the first rotating electrical machine generating a torque for driving the vehicle;
   a second rotating electrical machine for starting the engine; and
   a starter generator as the first rotating electrical machine, the starter generator generating a torque for starting the engine or assisting driving of the engine when an electric power is supplied from the second battery, the starter generator being allowed to generate an electric power for charging the first battery and the second battery when receiving a rotational energy from the engine, wherein the second rotating electrical machine is a rotating electrical machine which is only used to start the engine at the initial start, when the engine is not warmed up, the second rotating electrical machine operates by an electric power supplied from the second battery, and the second rotating electrical machine is connected to the first battery via the second battery.

2. The vehicle according to claim 1, further comprising a motor-generator as the first rotating electrical machine, the motor-generator generating a torque for driving drive wheels when an electric power is supplied from the second battery, the motor-generator being allowed to generate an electric power for charging the first battery and the second battery when an input from the drive wheels or the engine is present.

3. The vehicle according to claim 1, further comprising:

a DC-DC converter disposed on an electric circuit connecting the first battery to the second battery, the DC-DC converter converting an input voltage and outputting the converted voltage;

battery remaining capacity detecting means that detects a remaining capacity of the first battery; and control means that performs a charge control of the first battery and the second battery, wherein the control means activates the DC-DC converter to charge the first battery by the electric power of the second battery when the remaining capacity of the first battery is detected to fall below a predetermined value when an ignition is OFF, the remaining capacity being detected by the battery remaining capacity detecting means.

* * * * *